(12) United States Patent
Monteil et al.

(10) Patent No.: US 8,403,364 B2
(45) Date of Patent: Mar. 26, 2013

(54) ADJUSTABLE STEERING COLUMN FOR MOTOR VEHICLES

(75) Inventors: Pascal Monteil, Saint Rimay (FR); Nicolas Genet, Vendome (FR); Antoine Oriac, Vendome (FR)

(73) Assignee: ZF Systemes de Direction Nacam SAS, Vendome (FR)

( * ) Notice: Subject to any disclaimer, the term of this patent is extended or adjusted under 35 U.S.C. 154(b) by 140 days.

(21) Appl. No.: 12/996,115

(22) PCT Filed: Jun. 4, 2009

(86) PCT No.: PCT/FR2009/000656
§ 371 (c)(1),
(2), (4) Date: May 9, 2011

(87) PCT Pub. No.: WO2009/147325
PCT Pub. Date: Dec. 10, 2009

(65) Prior Publication Data
US 2011/0210536 A1    Sep. 1, 2011

(30) Foreign Application Priority Data
Jun. 4, 2008 (FR) .................................. 08 53693

(51) Int. Cl.
*B62D 1/18* (2006.01)
(52) U.S. Cl. ....................... 280/775; 280/777
(58) Field of Classification Search .................. 280/775, 280/777, 779
See application file for complete search history.

(56) References Cited

U.S. PATENT DOCUMENTS

| | | | |
|---|---|---|---|
| 5,524,927 A | 6/1996 | Toussaint | |
| 5,737,971 A * | 4/1998 | Riefe et al. | 74/493 |
| 6,131,481 A * | 10/2000 | Wilson et al. | 74/493 |
| 7,293,481 B2 * | 11/2007 | Li et al. | 74/493 |
| 7,735,868 B2 * | 6/2010 | Ridgway et al. | 280/775 |
| 7,810,409 B2 * | 10/2010 | Okada et al. | 74/493 |
| 8,047,096 B2 * | 11/2011 | Ridgway et al. | 74/493 |
| 2006/0021460 A1 * | 2/2006 | Schulz | 74/493 |
| 2008/0191457 A1 * | 8/2008 | Ridgway et al. | 280/775 |

FOREIGN PATENT DOCUMENTS

| | | |
|---|---|---|
| EP | 0641705 A1 | 3/1995 |
| FR | 2881707 A1 | 8/2006 |
| GB | 2281539 A | 3/1995 |
| WO | 9604162 A1 | 2/1996 |

* cited by examiner

*Primary Examiner* — Toan To
(74) *Attorney, Agent, or Firm* — Buchman & LaPointe, P.C.

(57) ABSTRACT

An adjustable steering column for a motor vehicle has a support assembly intended to be fixed to a chassis of a vehicle, a tubular body slidably mounted in the support assembly, adjustment and locking devices able to switch from a state of a adjusting the position of the tubular body in the support assembly to a state of immobilizing the tubular body in a desired adjusted position within the support assembly, a plastically deformable energy-absorbing element collaborating with a deformation member secured to the tubular body so that it undergoes plastic deformation as the tubular body retracts inside the support assembly following an impact transmitted to the tubular body when the adjustment and locking devices are in the locked state and a ratchet mechanism for securing the plastically deformable element to the support assembly during plastic deformation of the plastically deformable element.

20 Claims, 7 Drawing Sheets

ADJUSTABLE STEERING COLUMN FOR MOTOR VEHICLES

BACKGROUND OF THE INVENTION

1. Field of the Invention

The invention relates to an adjustable steering column for motor vehicles.

More particularly, the invention relates to a depth-adjustable (axial adjustment) or depth and height-adjustable (axial and radial adjustment) steering column, the steering column comprising a tubular body slidably mounted in a support assembly, means for adjusting the position of the tubular body in the support assembly and for locking in the desired position, as well as a device enabling to dissipate or absorb the energy generated during a frontal collision of the vehicle with an obstacle, following an impact of the driver on the steering column.

2. Prior Art

The implementation of energy-absorption devices on steering columns is known per se. By way of example, it is worth quoting the patent application GB 2 281 539. However, the device described in this document, shows the drawback of imposing the use of structurally distinct members in order to obtain a device which fulfills both the energy absorption function and the axial retention function.

In order to attempt to overcome this drawback, it has been proposed in the international application WO96/04162 to combine the means for adjusting the position of the steering column with the energy-absorption mechanism. Thus, it has been proposed a device enabling to axially adjust the steering column and conjointly dissipate the energy generated by the driver impact on the steering column.

To do this, the steering column comprises a tubular body slidably mounted in a fixed support member, the tubular body bearing first locking means for a releasable engagement with second locking means. The steering column further comprises a cam element intended to bring the first and second locking means to come into engagement with each other and thus, lock the tubular body with respect to the support member. The second locking means are connected to an energy-absorbing device comprising an elongated guide strip arranged around a shaft secured to the fixed support member around which the elongated guide strip may be pulled. The arrangement is such that, in normal use, the tubular body can be adjusted by sliding into the support member then locked in the required position by said first and second locking means. When the vehicle undergoes a frontal impact, the energy applied on the steering column drives the tubular body into the support member (retraction of the tubular body), bringing the first and second locking means, locked together, to pull the elongated member around the shaft such as to absorb the energy.

The steering column of WO96/04162 and the associated absorption and adjusting device nevertheless exhibit several drawbacks.

A major drawback is the number of pieces necessary for implementing the device combining the functions for adjusting the steering column and for energy dissipation, and more particularly essential for maintaining the locking means locked together, depending on whether the locking situation is a collision-free locking situation or a locking situation without collision. In fact, in the collision-free locking situation, a spring forming member and a cam element are provided, the latter acting on the spring forming member in order to keep the second locking means engaged on the first locking means. However, when a collision occurs, due to the fact of the retraction of the tubular body into the support member, the spring forming member is no longer in contact with the cam element. Keeping engaged the first and second locking means is then carried out by additional means acting on the spring forming member. The additional means consist in a platform provided within the support member.

Moreover, the arrangement of the different means requires a precise positioning as well as an adapted dimensioning of the spring forming member in order to prevent possible friction between the spring forming member and the platform. Such friction would in fact hinder the implementation of the energy-absorption mechanism.

Likewise, the device of WO96/04162 is such that the first and second locking means, the spring forming member and the cam element impose specific locations in order to enable the implementation of the locking means and the energy-absorption mechanism.

Finally, due to the fact that the shaft around which the elongated guide strip forming the energy-absorption device may be pulled is secured to the support member and that the locking means are carried by the tubular body during the retraction of the tubular body, the absorption of energy is not always ensured at the start of the tubular body retraction. In fact, this depends on the position of the tubular body in the support assembly during the impact and on the original positioning of the pieces with respect to each other.

It also has been known from the French patent application FR 2 881 707 an instantaneous energy absorption device intended to equip a steering column, the device comprising a fixed intermediary member connected to the support assembly of the column, a movable intermediary member connected to the tubular body of the column and at least one energy absorption member connecting the fixed member to the movable member. More particularly, the energy absorption member is anchored to an anchoring pin provided on the mobile intermediary member on the one hand and to a retaining pin provided on the fixed intermediary member on the other hand. The fixed intermediary member is fixed to the support assembly by means of a ratchet mechanism.

Due to the fact of the number of pieces necessary for mounting the member enabling the energy absorption between the support assembly and the tubular body of the steering column, the assembling of the previously described absorption device to a steering column proves to be somewhat difficult. It particularly requires distinct fixations for each of the members forming the energy absorption device.

SUMMARY OF THE INVENTION

The invention aims to remedy to the issues of the aforementioned prior art by proposing an adjustable steering column at least axially and able to absorb the energy generated on the entire retraction travel of the tubular body, and whereof the number of pieces is reduced.

With this regard, and according to a first aspect, the invention provides an adjustable steering column for motor vehicles comprising a support assembly to be fixed on the chassis of a vehicle, a tubular body of longitudinal axis AA, slidably mounted in the support assembly, adjustment and locking means capable of switching from a state of adjusting the position of the tubular body in the support assembly to a state of immobilizing the tubular body in a desired adjusted position in the support assembly, a plastically deformable energy-absorbing element cooperating with a deformation member secured to the tubular body so that it undergoes plastic deformation as the tubular body retracts inside the support assembly following an impact imparted to the tubular body when the adjustment and locking means are in a locked state, and a ratchet mechanism to secure the plastically deformable element to the support assembly during plastic deformation of the plastically deformable element.

In practice, the deformation member will be a member exhibiting a rounded side and provided on the external wall of the tubular body. The plastically deformable element is thus arranged to at least partially wind the rounded side of the deformation member. Thus, as the tubular body retracts inside the support assembly, will drive the plastically deformable element, the latter unwinding onto the deformation member. According to a specific configuration, the tubular body exhibits a peripheral extension forming the deformation member.

Advantageously, the ratchet mechanism is arranged to cooperate directly with the plastically deformable element during its plastic deformation. Thus, this enables to limit the number of pieces that are necessary for the implementation of the energy dissipation, and hence to reduce the cost and time necessary for the assembly of the pieces of the steering column.

Advantageously, the ratchet mechanism comprises a guide strip secured to the plastically deformable element and cooperating with a mobile pawl.

Advantageously, the pawl is associated to the adjustment and locking means such that, when the adjustment and locking means switch from an adjusting state to a locked state, the pawl switches from a released position to a position in which it contacts the guide strip. Thus, this configuration makes it possible, when acting on the adjustment and locking means, to act simultaneously on the ratchet mechanism.

According to a particularly advantageous configuration, the ratchet mechanism comprises elastic means to engage the pawl with the guide strip during the plastic deformation of the plastically deformable element. Thus, this makes it possible to permanently maintain the contact of the pawl against the guide strip on the one hand and to engage the pawl with the guide strip during an impact imparted to the tubular body on the other hand. Elastic means may be provided so as to be formed of one single piece with the pawl.

Advantageously, the guide strip comprises recesses provided incrementally on the guide strip and arranged to mesh with the teeth of the pawl.

Advantageously, the adjustment and locking means comprise a control member to allow the adjustment and locking means to switch from an adjusting state of to the immobilizing state. This control member may, according to the required configurations, be manually or motor operated.

Advantageously, the adjustment and locking means comprise a connecting shaft, directly or indirectly connecting the control member with the pawl, the connecting shaft being rotationally movable around a perpendicular axis to axis AA of the tubular body under the action of the control member.

In the case of a direct connection, the pawl may be provided such that it comprises a housing traversed by the connecting shaft, the housing being configured to prevent any movement of the connecting shaft with respect to the pawl.

In the case of an indirect connection, the passage from the released position to the contacting position of the pawl on the guide strip, the pawl being accordingly secured to the support assembly, is carried out under the action of an intermediary piece secured to the connecting shaft.

Advantageously, the guide strip is fixed to the tubular body by means of a shearing dowel. The shearing dowel enables additional energy absorption than that generated by the plastically deformable element.

According to a specific configuration, the plastically deformable element consists of a guide strip arranged in the extension of the guide strip. In order to reduce the number of pieces, it may be advantageous to provide a strap and a guide strip forming one same and single piece.

BRIEF DESCRIPTION OF THE DRAWINGS

Other objects and advantages of the invention will become more apparent in the following description, with reference to the accompanying drawings, in which.

For more clarity, identical or similar elements of the various embodiments are marked by identical reference signs in the set of figures.

DETAILED DESCRIPTION OF THE PREFERRED EMBODIMENT(S)

In relation to FIGS. 1 to 8, it has been described a steering column 1 for motor vehicle, the steering column being adjustable at least axially.

Figure 1:
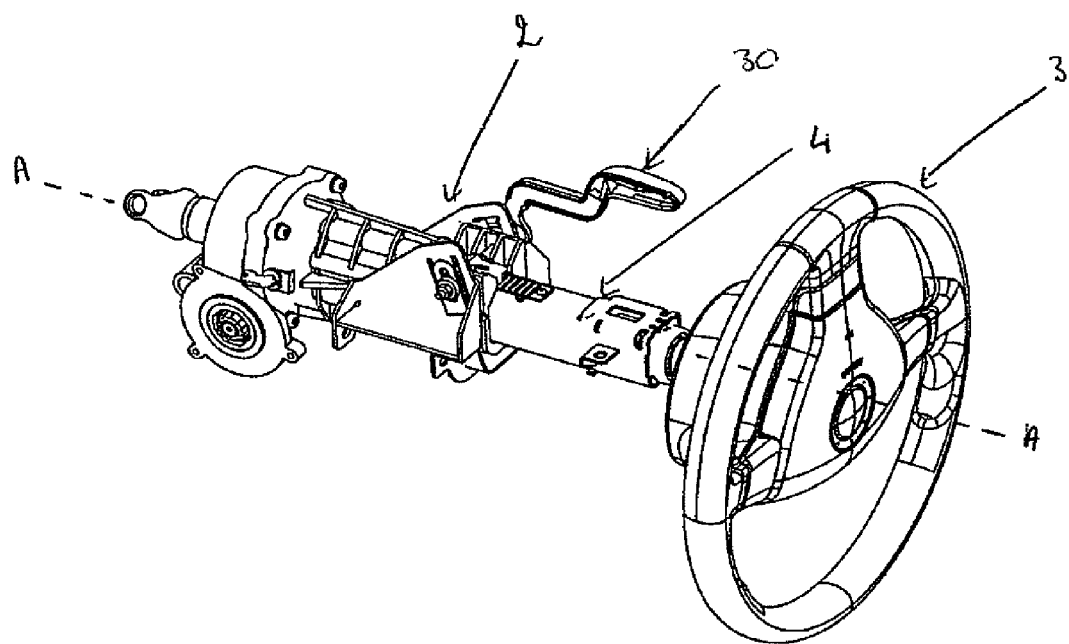
FIG. 1 represents a bottom perspective view of an adjustable steering column according to the invention, the steering column being equipped with a steering wheel.
Figure 2:
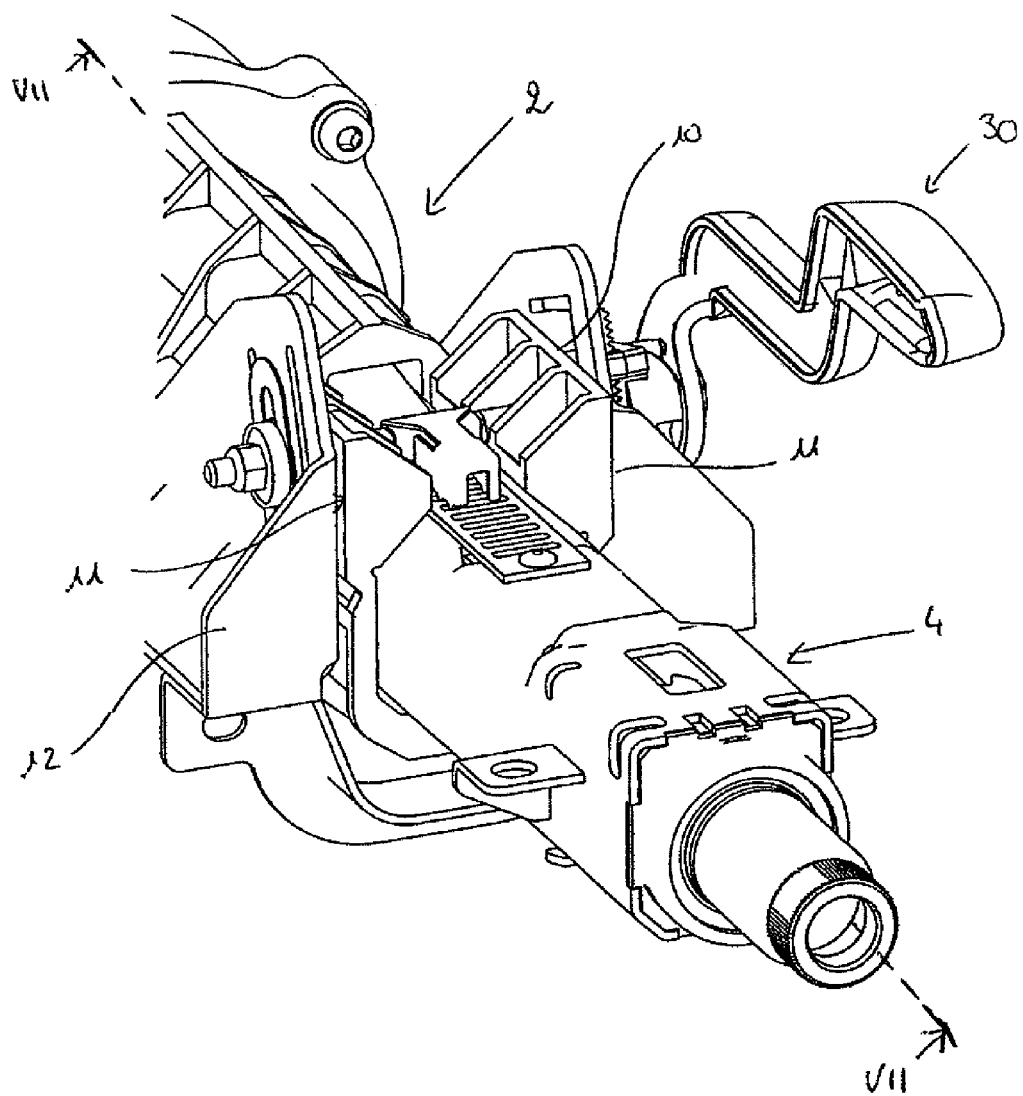
FIG. 2 represents an enlarged view of the steering column of FIG. 1, the steering column being in locked position.
Figure 3:
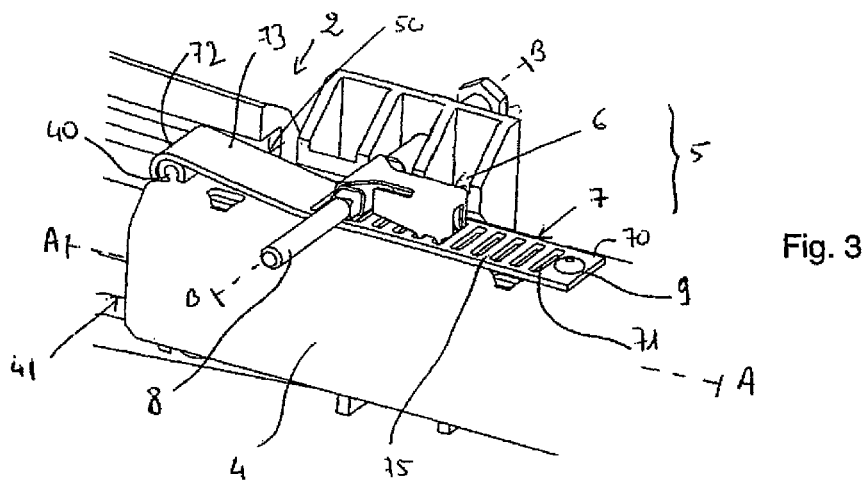
FIG. 3 represents a partial view of the steering column of FIG. 2, the steering column comprising adjustment and locking means in locked engaged position.

The steering column 1 comprises a support assembly 2 intended to be fixed on a chassis of a vehicle (not shown) and a tubular body 4, of longitudinal axis AA, whereon the vehicle steering wheel 3 is fixed, as shown in FIG. 1. The tubular body 4 is slidably mounted in the support assembly 2 such as to enable the adjustment of the steering wheel (axial adjustment) depth by sliding the tubular body 4 into the support assembly 2.

In order to maintain the steering wheel according to the required depth, the steering column 1 comprises adjustment and locking means able to switch from a state of adjusting the position of the tubular body 4 inside the support assembly 2 to a state of immobilizing the tubular body in a desired adjusted position inside the support assembly 2.

In the described embodiment, the adjustment and locking means comprise a guiding flange 10 wherein the tubular body 4 is mounted and two clamping lugs 12 intended to abut on both sides of the flanks 11 of the guiding flange 10. The guiding flange 10 makes it possible to axially guide the tubular body 4 inside the support assembly 2.

A cam system comprising a rotationally movable cam element and a fixed cam element makes it possible to clamp the assembly of clamping lugs 12, guiding flange 10 and tubular body 4. The mobile cam element is driven by means of a control member. In the described embodiment, the control member comprises a control lever 30 making it possible to manually activate the clamping of the members together such as to lock the tubular body 4 inside the support assembly 2, and thus make the adjustment and locking means switch from the adjusting state to an immobilization state.

The steering column also comprises a plastically deformable energy-absorbing element 50 intended to undergo plastic deformation as the tubular body 4 retracts inside the support assembly 2 following an impact imparted to the tubular body 4, as well as a ratchet mechanism 5 intended to secure the plastically deformable element 50 to the support assembly 2 during the plastic deformation of the element 50.

The ratchet mechanism 5 comprises first and second locking members arranged to cooperate with each other, one of the locking members being secured to the support assembly 2, the other locking member being fixed to the tubular body 4.

More particularly, the locking member secured to the support assembly 2 comprises a mobile pawl 6, which comprises teeth 61 arranged to cooperate with recesses 71 provided on a guide strip 7 constituting the locking member fixed on the tubular body 4. In the described embodiment, the recesses 71 are distributed regularly on the guide strip 7.

Figure 4:
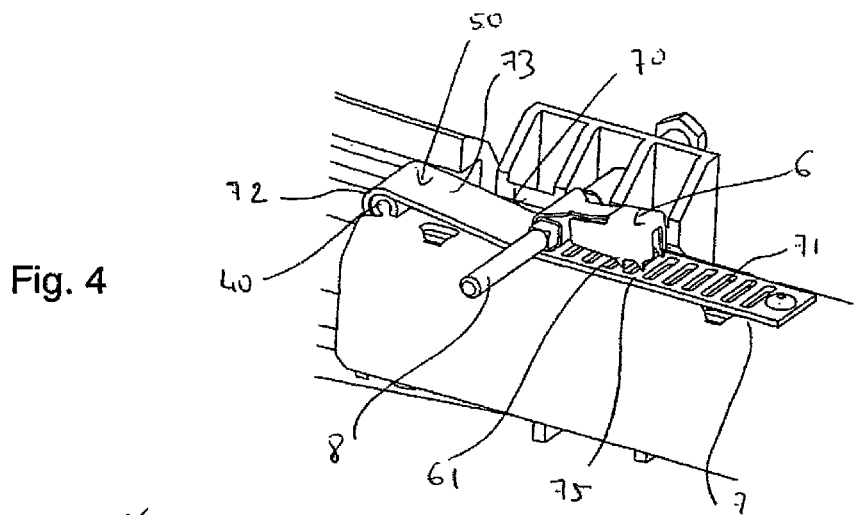
FIG. 4 represents a partial view of the steering column of FIG. 2, the steering column comprising adjustment and locking means in locked non-engaged position.
Figure 5:
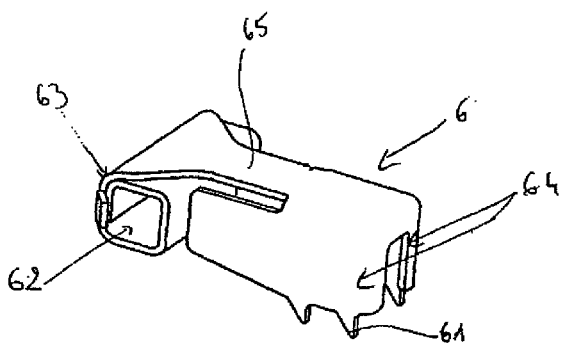
FIG. 5 represents a view of one of the locking members forming the adjustment and locking means of the steering column.

Advantageously, the pawl 6 is associated to the adjustment and locking means such that, when the latter switch from the adjusting state to an immobilization state, the pawl 6 switches from a released position (FIG. 6) to a position in which it contact the guide strip 7 (FIGS. 4 and 5).

In the described embodiment, the pawl 6 is fixed on the support assembly 2 by means of a connecting shaft 8 rotationally movable around an axis BB perpendicular to the longitudinal axis AA of the tubular body 4.

More particularly, the pawl 6 comprises a square-section tubular housing 62, accommodating the connecting shaft 8. The latter is dimensioned such as to maintain the pawl 6 stationary on the connecting shaft 8, and thus prevent any rotation of the latter within the housing 62.

It is obvious that the pawl 6 may be maintained stationary on the connecting shaft 8 by other techniques such as screwing, welding, riveting or by means of a fitting of polygonal shape arranged between the walls that delineate the housing 62 and the connecting shaft 8.

As for the guide strip 7, it is secured to the plastically deformable element 50. In the described embodiment, the guide strip 7 and the plastically deformable element 50 are formed of one single piece and come in the shape of a strap 70. It may also be provided a guide strip 7 fixed directly on the plastically deformable element 50.

Figure 7:
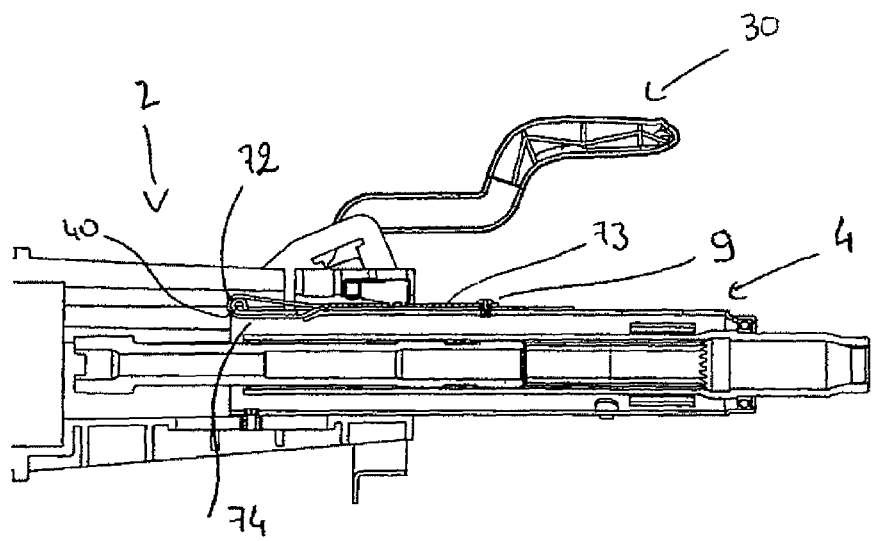
FIG. 7 represents a cross-sectional view of the steering column of FIG. 2 according to the axis VII-VII.
Figure 8:
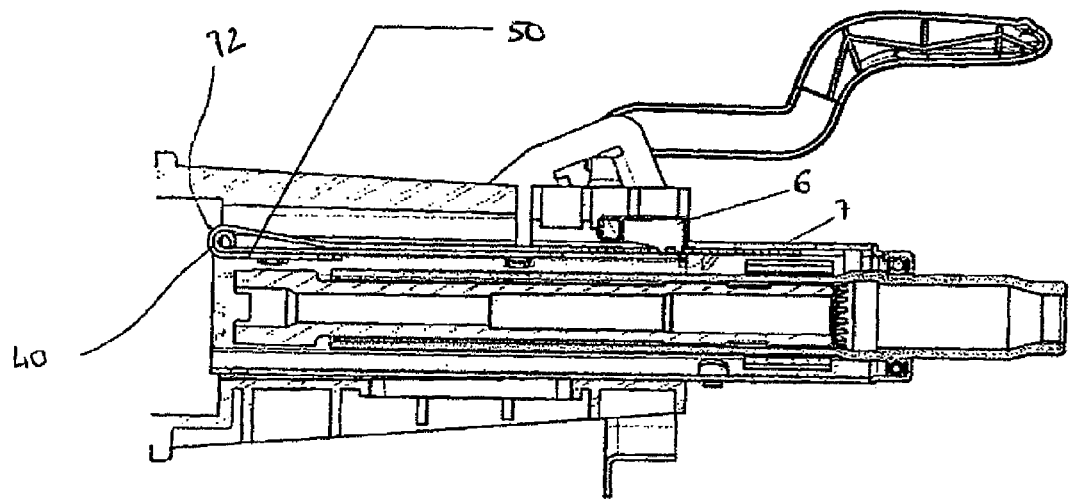
FIG. 8 represents a cross-sectional view of the steering column of FIG. 7 after a frontal impact of the vehicle with an obstacle.

More particularly, the strap 70 is folded over such as to form a U-shape. It is arranged on the internal end 41 of the tubular body 4 such as to exhibit a part 73 mounted on the outside of the tubular body 4, the other part 74 being arranged inside the tubular body 4. As shown in FIGS. 4, 7 and 8, the curved part 72 of the flat strap 70 is arranged pressed on an extension 40 in arc of circle shape formed on the internal end 41 of the tubular body 4. By internal end is meant the end of the tubular body arranged inside the support assembly 2.

The part 73 of the flat strap 70 mounted outside the tubular body 4 comprises the transversal recesses 71 equidistant to one another. Thus, the portion of the part 73 bearing the recesses 71 constitutes the guide strip 7, the curved part 72 and the part 74 arranged inside the tubular body 4 of the strap 70 constituting the plastically deformable element 50 of the steering column.

As illustrated in FIG. 7, the two ends of the flat strap 70 are fixed on the tubular body 4 by means of a shearing dowel 9 traversing the wall of the tubular body 4. Advantageously, the shearing dowel 9 is made from plastic. Thus, and as one may see further on, the shearing dowel 9 constitutes an additional energy-absorbing means to that formed by the part 72 and 74 of the strap 70 during the frontal impact of the vehicle with an obstacle. It is of course obvious that other fixing means of the strap 70 on the tubular body 4 may be implemented such as a rivet, welding or clinching. Likewise, depending on the case, it may be advantageous to only fix the flat strap 70 on the tubular body 4 at one of its ends.

In the described embodiment, the strap 70 exhibits a constant width and thickness on its entire length. However, it would be advantageous in some cases to provide a strap 70 exhibiting a non constant width and/or thickness.

The ratchet mechanism 5 further comprises elastic means which make it possible to ensure keeping the pawl 6 in contact against the guide strip 7 on the one hand, and the engaging of the pawl 6 with the guide strip 7 during an impact imparted to the tubular body 4 following a collision of the vehicle with an obstacle on the other hand. Advantageously, the elastic means are formed of one single piece with the pawl 6.

According to a preferred embodiment of the invention, the pawl 6 is formed in one single piece (FIG. 5). In this embodiment, the pawl 6, achieved based on a steel strap exhibits an end formed by a winding 63 of the strap, the winding being achieved such as to form a square-shaped section housing corresponding to the previously defined housing 62. The pawl 6 comprises, on the end opposing the winding 63, two reinforcement members 64, extending in a substantially perpendicular plan to the plan of the strap, and bearing the teeth 61 of the pawl 6. The part 65 forming the junction between the reinforcement members 64 and the winding 63 consists in a blade serving as a spring. This spring blade constitutes the elastic means of the ratchet mechanism.

The functioning principle of the steering column 1 presented above will now be described.

Figure 6:
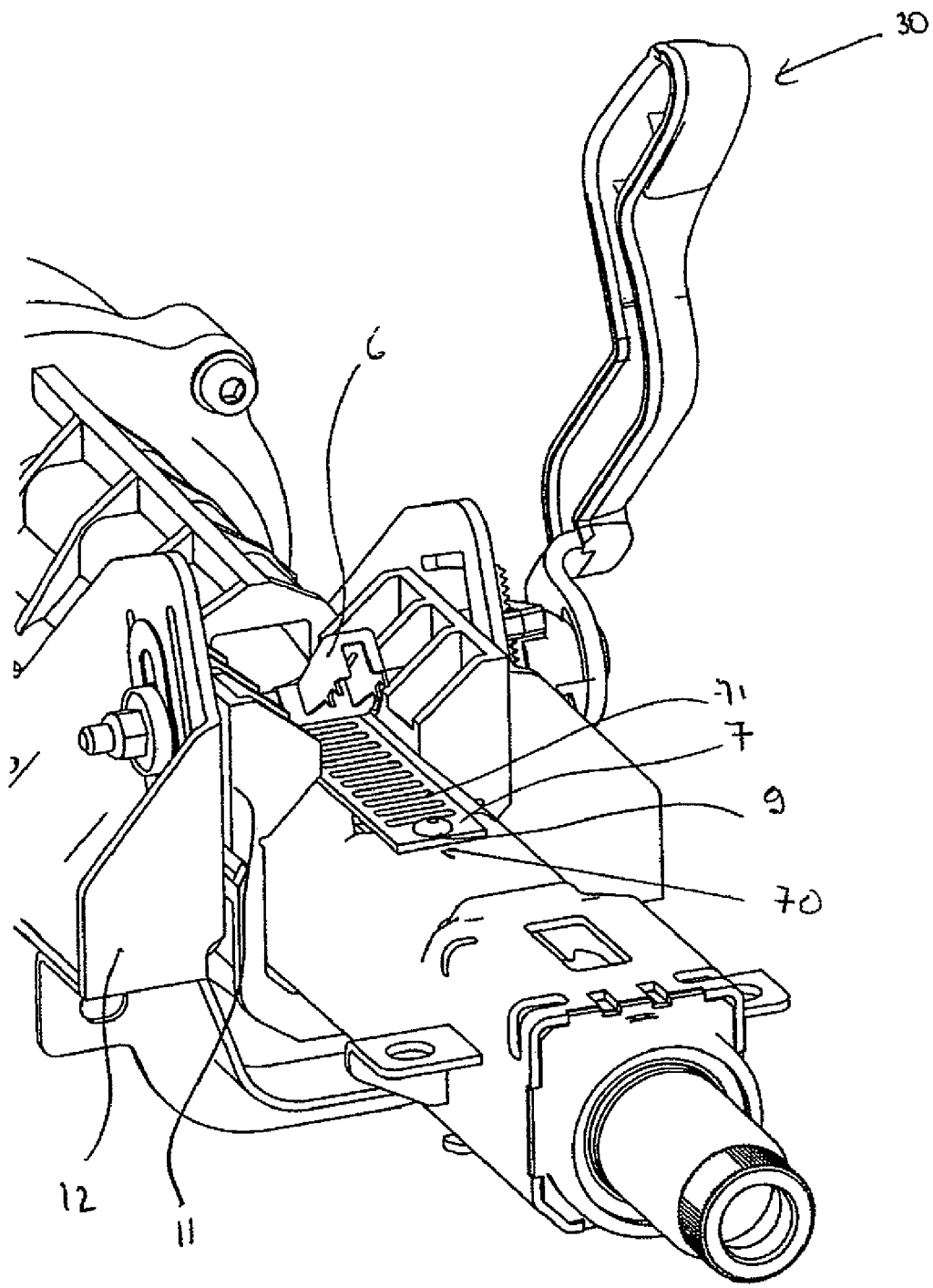
FIG. 6 represents an enlarged view of the steering column of FIG. 1, the steering column being in unlocked position.

When one wishes to adjust the position of the steering wheel 3, the control lever 30 is arranged in a position wherein the adjustment and locking means are in adjusting position and the ratchet mechanism is in released position (lever in unlocked position—FIG. 6). During the switching from the locked position (adjustment and locking means in locked position and ratchet mechanism in contacting position as illustrated in FIGS. 2 to 4 and 7) to the unlocked position, the pawl 6 swivels around axis BB of the connecting shaft 8. The pawl 6 is then no longer in contact with the guide strip 7, and the clamping lugs 12 are no longer clamped onto the guiding flange 10 which thus in turn no longer exerts any pressure on the tubular body 4. The adjusting of the position of the tubular body 4 with respect to the support assembly 2 may thus be done freely.

The connecting shaft 8 and the ratchet 6 thus being kept stationary with respect to the guiding flange 10, the tubular body 4, firmly connected to the steering wheel 3, may thus slide freely inside the flange in order to enable the in-depth adjustment of the steering wheel. The guide strip 7 and the plastically deformable element 50, retained on the tubular body 4 by the shearing dowel 9 is thus also in movement with respect to the guiding flange 10 and to the pawl 6.

In driving position, the control lever 30 is arranged in a position wherein the adjustment and locking means are in locked position, the pawl and the guide strip of the ratchet mechanism being in contacting position (locked position of the control lever 30). During the switching of the unlocked position to the locked position, the clamping lugs 12 are clamped on the guiding flange 10 which is itself clamped on to the tubular body 4, which is thus maintained stationary with respect to the support assembly 2. In order to ensure the clamping between the guiding flange 10 and the tubular body 4, it is advantageous to dimension the width of the strap 70 such as to leave sufficient clearance between the flanks of the strap 70 and the guiding flange 10.

In the locked position, the teeth 61 of the pawl 6 are in contact with the front of the guide strip 7. According to the axial position of the guide strip 7 with respect to the pawl 6, the teeth 61 of the latter are either well meshed in the recesses 71 provided on the guide strip 7 (FIG. 3), or pressed against the part 75 connecting the two recesses together (FIG. 4). In the case where the tubular body 4 is positioned such that the teeth 61 of the pawl 6 are in contact with the parts 75 arranged between the recesses 71, and not inside the recesses 71, the complete closing of the control lever 30 is allowed due to the flexibility conferred by the spring blade of the pawl 6. In both configurations, the pawl 6 is kept under pressure on the strap 70 thanks to the spring effect of the blade.

When a frontal collision of the vehicle with an obstacle occurs, the tubular body 4 retracts inside the support assembly 2, the control lever 30 being in locked position.

If the teeth 61 of the pawl 6 are meshed in the recesses 71 of the guide strip 7, the latter engaged in the pawl 6 remains stationary with respect to the guiding flange 10 whereas the tubular body 4 retracts. During retraction, the internal end 41 of the tubular body 4 provided with the extension 40 in arc of circle shape results in the unwinding of the strap 70 around the extension 40, together with a shearing of the shearing dowel 9. The unwinding of the strap 70, and thus its deformation, makes it possible to absorb the energy generated by the tubular body 4 on the entirety of its retraction travel in the support assembly 2. The rupture of the shearing dowel 9 further enables an additional energy absorption at the beginning of the retraction of the tubular body 4 inside the support assembly 2.

If the teeth 61 of the pawl 6 are not meshed in the recesses 71 of the guide strip 7, the latter will thus slide under the teeth 61 of the pawl 6 until the teeth 61 arrive in front of one of the guide strip 7 recesses. Thanks to the pressure exerted on the strap 70 by the spring blade of the pawl, the teeth 61, when they arrive in front of a recess, automatically mesh in the appropriate recess. One thus finds oneself in the configuration where the teeth of the pawl 6 are meshed in the strap 7 recesses.

Figure 9:
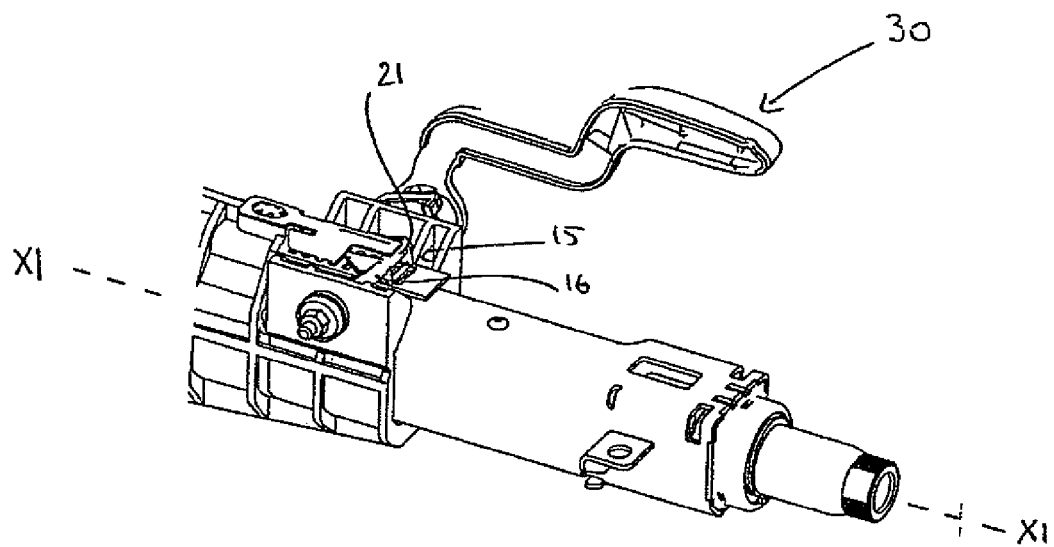
FIG. 9 represents a perspective view of a steering column according to an alternative embodiment, the steering column being in locked position.
Figure 10:
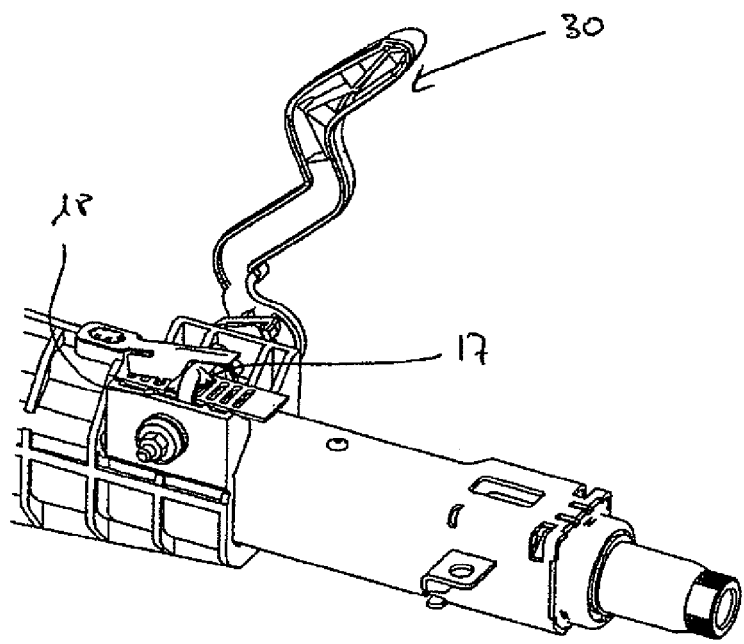
FIG. 10 represents a perspective view of the steering column of FIG. 9, the steering column being in unlocked position.
Figure 11:
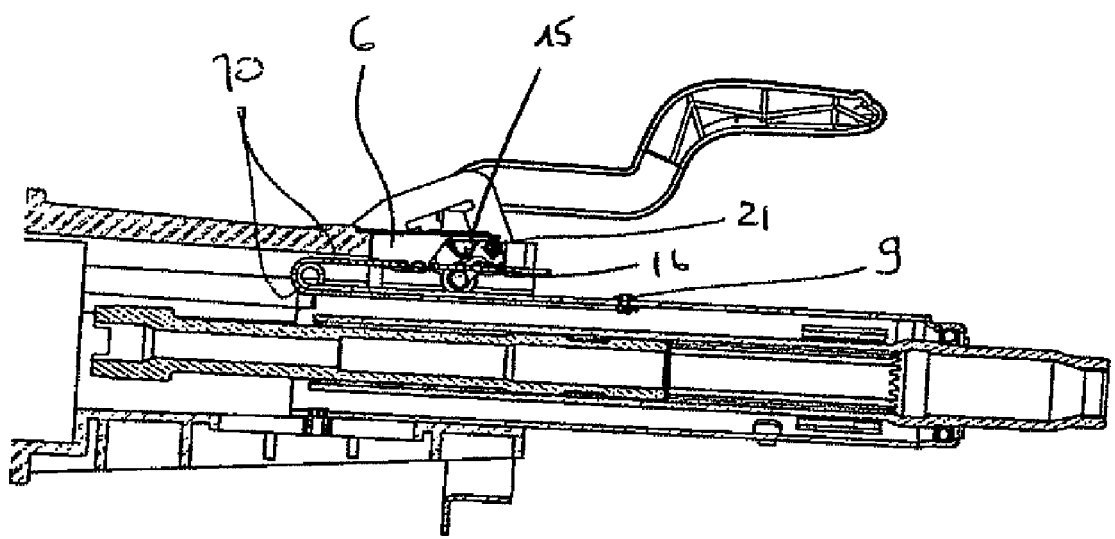
FIG. 11 represents a cross-sectional view of the steering column of FIG. 9 according to the axis XI-XI.

With reference to FIGS. 9, 10 and 11, an alternative embodiment of the steering column 1 is described.

In this alternative, the pawl 6 is fixed directly onto the support assembly 2. In order to enable a disengagement of the pawl 6 from the guide strip 7, an intermediary piece 15 is fixed to the connecting shaft 8. This piece is arranged to lift the pawl 6 when the connecting shaft 8 is rotationally driven under the unlocking action of the control lever 30, the rotation of the connecting shaft 8 leading to the rotation of the intermediary piece 15.

In the described embodiment, the intermediary piece 15 comprises two lever arms 16 fixed on the connecting shaft 8 and extending on either side of the lateral edges of the guide strip 7. The two lever arms 16 are connected together by a contact member 21 with the pawl 6.

The intermediary piece 15 advantageously comprises a first set of support lugs 17 arranged to abut against the guide strip 7 when the control lever 30 is locked (FIG. 9). The support lugs 17 thus enable to prevent vibrations of the guide strip 7 while the vehicle is moving. They also enable to prevent the guide strip 7 from vibrating while it unwinds during a frontal impact of the vehicle with an obstacle and thus does not have any effect on energy dissipation.

It may be provided another set of support lugs 18, as a replacement to or as a complement to the first set, the support lugs 18 of the second set being arranged to abut against the guide strip 7 when the control lever 30 is in unlocked position (FIG. 10). The support lugs 19, 20 thus enable to prevent that the guide strip 7 from going up at the same time as the pawl 6 during the unlocking of the control lever 30.

The functioning of the steering column illustrated in FIGS. 9, 10 and 11 is identical to that described for the steering column illustrated in FIGS. 1 to 8.

In the previously described embodiments, the energy absorption means are exhibited in the form of a strap arranged in the extension of the guide strip. It is of course obvious that the invention is not limited to such a configuration of the energy absorption means and that other devices such as a helical wire strap, a deformation strap or spiral-wound strap may be considered in an adjustable steering column without departing from the field of the invention.

Likewise, it has been represented a connecting shaft 8 which is manually rotationally driven by means of a control lever 30. It is of course obvious that the control lever 30 may be replaced by an electric motor, such as to automatically drive the connecting shaft 8.

The invention is described by way of example in what precedes. It is obvious that the skilled person is able to achieve the various alternative embodiments of the invention without departing from the scope of the invention.

The invention claimed is:

1. An adjustable steering column for motor vehicles comprising:
    a support assembly to be fixed on a chassis of a vehicle,
    a tubular body, having a longitudinal axis, slidably mounted in the support assembly,
    adjustment and locking means capable of switching from a state of adjusting the position of the tubular body in the support assembly to a state of immobilizing the tubular body in a desired adjusted position in the support assembly,
    a plastically deformable energy-absorbing element cooperating with a deformation member secured to the tubular body so that the plastically deformable energy-absorbing element undergoes plastic deformation as the tubular body retracts inside the support assembly following an impact imparted to the tubular body when the adjustment and locking means are in an immobilization state, and
    a ratchet mechanism to secure the plastically deformable element to the support assembly during the plastic deformation of the plastically deformable element.

2. The steering column as claimed in claim 1, wherein the ratchet mechanism is arranged to directly cooperate with the plastically deformable element during plastic deformation thereof.

3. The steering column as claimed in claim 1, wherein the ratchet mechanism comprises first and second locking members arranged to cooperate with each other, one of the locking members being secured to the support assembly, and the other locking member being fixed on the tubular body.

4. The steering column as claimed in claim 1, wherein the ratchet mechanism comprises a guide strip secured to the plastically deformable element and cooperating with a mobile pawl.

5. The steering column as claimed in claim 4, wherein the pawl is associated to the adjustment and locking means such that, when the adjustment and locking means switch from the adjusting state to the immobilization state, the pawl switches from a released position to a position in which the pawl contacts the guide strip.

6. The steering column as claimed in claim 4, wherein the ratchet mechanism, comprises elastic means to engage the pawl with the guide strip during plastic deformation of the plastically deformable element.

7. The steering column as claimed in claim 6, wherein the elastic means are formed as one single piece with the pawl.

8. The adjustable steering column as claimed in claim 4, wherein the guide strip comprises recesses provided incrementally on the guide strip and arranged to mesh with the teeth of the pawl.

9. The steering column as claimed in claim 1, wherein the adjustment and locking means comprise a control member to make the adjustment and locking means switch from the adjusting state to the immobilization state.

10. The steering column as claimed in claim 9, wherein the control member is a manual control lever.

11. The steering column as claimed in claim 9, wherein the control member is motor operated.

12. The steering column as claimed in claim 9, wherein the adjustment and locking means comprise a connecting shaft connecting the control member to a pawl, a connecting shaft being rotationally movable mobile around an axis perpendicular to the longitudinal axis of the tubular body under the action of the control member.

13. The steering column as claimed in claim 2, wherein the connecting shaft directly connects the control member to the pawl.

14. The steering column as claimed in claim 2, wherein the connecting shaft indirectly connects the control member to the pawl.

15. The steering column as claimed in claim 2, wherein the pawl comprises a housing traversed by the connecting shaft, and the housing being configured to prevent any movement of the connecting shaft with respect to the pawl.

16. The steering column as claimed in claim 2, wherein the pawl is secured to the support assembly, and switching of the pawl from a released position to a contacting position on a guide strip being carried out under the action of an intermediary piece secured to the connecting shaft.

17. The steering column according as claimed in claim 4, wherein the guide strip is fixed on the tubular body by a shearing dowel.

18. The steering column as claimed in claim 4, wherein the plastically deformable element consists of a strap arranged in the extension of the guide strip.

19. The steering column as claimed in claim 18, wherein the strap and the guide strip form one single piece.

20. The steering column according as claimed in claim 1, wherein the tubular body comprises a peripheral extension, of rounded shape, around which the plastically deformable element is at least partially wound, and the extension forming the deformation member.

* * * * *